(12) United States Patent
Zhang et al.

(10) Patent No.: US 9,199,865 B2
(45) Date of Patent: Dec. 1, 2015

(54) METHOD FOR TREATMENT OF DYEING WASTEWATER BY USING UV/ACETYLACETONE OXIDATION PROCESS

(71) Applicant: NANJING UNIVERSITY, Nanjing (CN)

(72) Inventors: Shujuan Zhang, Nanjing (CN); Mengshu Wang, Nanjing (CN); Xitong Liu, Nanjing (CN); Bingcai Pan, Nanjing (CN); Lu Lv, Nanjing (CN); Weiming Zhang, Nanjing (CN)

(73) Assignee: NANJING UNIVERSITY (CN)

( * ) Notice: Subject to any disclaimer, the term of this patent is extended or adjusted under 35 U.S.C. 154(b) by 0 days.

(21) Appl. No.: 14/353,875

(22) PCT Filed: Nov. 21, 2012

(86) PCT No.: PCT/CN2012/084930
§ 371 (c)(1),
(2) Date: Apr. 24, 2014

(87) PCT Pub. No.: WO2013/086921
PCT Pub. Date: Jun. 20, 2013

(65) Prior Publication Data
US 2014/0291256 A1 Oct. 2, 2014

(30) Foreign Application Priority Data
Dec. 15, 2011 (CN) .......................... 2011 1 0419706

(51) Int. Cl.
*C02F 1/30* (2006.01)
*C02F 1/32* (2006.01)
(Continued)

(52) U.S. Cl.
CPC .................. *C02F 1/325* (2013.01); *C02F 1/725* (2013.01); *C02F 2101/308* (2013.01)

(58) Field of Classification Search
CPC ................ C02F 9/08; C02F 1/30; C02F 1/66; C02F 101/34; C02F 1/74; C02F 101/38; C02F 103/36; B01J 23/745
USPC .............. 422/20, 22, 186, 186.3; 210/748.01, 210/748.14
See application file for complete search history.

(56) References Cited

U.S. PATENT DOCUMENTS 4,012,321 A 3/1977 Koubek
5,538,636 A 7/1996 Gnann et al.
(Continued)

FOREIGN PATENT DOCUMENTS

| CN | 101011660 A | 8/2007 |
| CN | 101531406 A | 9/2009 |

(Continued)

OTHER PUBLICATIONS

Chen, Guie et al., Study on Treating Reactive Brilliant Blue KN-R Dyestuff Wastewater by 1-6 UV-hydrogen peroxide, Proceedings of the 2009 Academic Annual Conference of Shanghai Society of Chemistry and Chemical Industry, Nov. 15, 2009, pp. 137-138, ISSN 0367-6358.

(Continued)

*Primary Examiner* — Walter D Griffin
*Assistant Examiner* — Cameron J Allen
(74) *Attorney, Agent, or Firm* — Schmeiser, Olsen & Watts, LLP

(57) ABSTRACT

A method for treatment of dye wastewater by using ultraviolet-acetylacetone oxidation process is provided. This method belongs to the field of dye wastewater treatment, comprising the following steps: A) adding acetylacetone into dye-containing water, stirring and mixing them completely; B) putting the liquid obtained in step A) under ultraviolet irradiation till it is effectively decolorized. Provided is a new method for decolorizing high-concentrated dye wastewater on the basis of ultraviolet-induced oxidation process of phydroxyl radicals. This method can realize complete decolorization of the dye wastewater. During the oxidation process, the dye in the wastewater acts as the photosensitizer and can accelerate the decolorization process as the reaction progresses. The method can also improve BOD5/COD ratio from lower than 0.1 to higher than 0.3, which means that this method can be used not only for high-efficient decolorization of dye wastewater, but also as a preliminary step of microorganism treatment.

6 Claims, 2 Drawing Sheets

(51) Int. Cl.
*C02F 1/72* (2006.01)
*C02F 101/30* (2006.01)

(56) References Cited

U.S. PATENT DOCUMENTS

| | | | | |
|---|---|---|---|---|
| 5,753,106 | A * | 5/1998 | Schenck | 210/96.1 |
| 6,555,835 | B1 | 4/2003 | Wydeven | |
| 2010/0147777 | A1* | 6/2010 | Takeuchi et al. | 210/760 |
| 2012/0118833 | A1* | 5/2012 | Lee et al. | 210/748.14 |
| 2013/0026062 | A1* | 1/2013 | Al-Shahrani et al. | 208/3 |

FOREIGN PATENT DOCUMENTS

| | | |
|---|---|---|
| CN | 101891274 A | 11/2010 |
| WO | 2013/086921 A1 | 6/2013 |

OTHER PUBLICATIONS

Yoon, M.C. et al., Photodissociation Dynamics of Acetylacetone: The OH Product 1-6 State Distribution, Journal of Chemical Physics, Jun. 22, 2009, vol. 110, No. 24, p. 11855, ISSN 0021-9606.
International Search Report; PCT/CN2012/084930; International File Date: Nov. 21, 2012; Nanjing University; 3 pgs.

* cited by examiner

METHOD FOR TREATMENT OF DYEING WASTEWATER BY USING UV/ACETYLACETONE OXIDATION PROCESS

FIELD OF TECHNOLOGY

The following relates to a method for treatment of dyeing wastewater by adopting ultraviolet oxidation process, specifically to a method for treatment of dyeing wastewater by using ultraviolet-acetylacetone process.

BACKGROUND

Advanced oxidation processes are a type of new techniques that have been widely adopted in treatment of wastewater containing high-concentrated toxic pollutants since 1980s. In most of advanced oxidation processes, highly reactive hydroxyl radicals (.OH) are generated and can mineralize or effectively degrade most of organic pollutants, and even completely converse them into harmless, small inorganic molecules. In terms of different oxidants and catalytic conditions adopted in the reaction, advanced oxidation processes are generally grouped into 6 categories: chemical oxidation process, chemical catalytic oxidation process, wet oxidation process, supercritical water oxidation process, photochemical or photochemical catalytic oxidation process, and electrochemical oxidation-reduction process. Among these processes, the photochemical oxidation process has become a research focus worldwide due to its mild reaction conditions, high oxidation activity and wide applicability in degrading recalcitrant pollutants. Currently, heterogeneous photocatalytic oxidation and homogeneous photo-oxidation are two types of most-studied photochemical oxidation processes. The most popular method to realize heterogeneous photocatalytic oxidation is to adopt semiconductive materials, and this method can degrade nearly all organics in the water. However, the homogeneous photo-oxidation, realized by coupling with ozone ($O_3$), hydrogen peroxide ($H_2O_2$) and Fenton reagent, presents much higher oxidation capacity and photolytic rate than heterogeneous photocatalysis. Therefore, it has been regarded as a simple and effective method in treatment of wastewater, and has attracted increasing attention from those who involves in environmental protection. Many related research findings have been published all over the world (U.S. Pat. No. 4,012,321, U.S. Pat. No. 6,555,835, WO patent 93/08129, China Patent 2009120021).

Dyeing wastewater is characterized with high chemical oxygen demand (COD), high chromaticity, strong acidity or alkalinity due to a large amount of organic substances and salts it contains. As a result, it poses a constant challenge in the field of wastewater treatment. The common homogeneous photo-oxidation processes, such as those adopting ultraviolet/$O_3$, ultraviolet/$H_2O_2$ and ultraviolet/Fenton systems, are somewhat effective in treatment of dyeing wastewater. However, these systems are constrained by many factors and are not practically feasible. For example, $O_3$ needs to be in situ generated, which consequently increases construction cost and operating expenses. In addition, the gas-liquid mass transfer existing therein lowers down operating efficiency as well. When Fenton reaction is adopted, a large amount of sludge containing metallic oxides will be generated, which not only leads to secondary pollution but also makes it hard to realize complete decolorization of water. The UV/$H_2O_2$ method is simpler in operation and maintenance in comparison with the above mentioned two methods, but its performance is severely affected by substances coexisting in wastewater. Besides, this method is also characterized with poor selectivity, large reagent consumption and high operating cost.

Acetylacetone is a small molecular diketone famously existing in two tautomeric forms (i.e. keto and enol forms) that rapidly interconvert. It is widely used as catalyst or cocatalyst, such as accelerant for oxygen oxidation, catalyst for pyrolysis or hydrogenation of petroleum, catalyst for isomerization process, and catalyst for polymerization of lower alkenes. The enol form of acetylacetone presents a large absorption cross-section in the ultraviolet region, and its gaseous phase can generate hydroxyl radicals (·OH) under ultraviolet irradiation. However, the photochemical properties of liquid-phase acetylactone have never been reported yet.

SUMMARY

1. The Technical Problems to be Solved

In order to solve the problems, such as poor selectivity, large reagent consumption and high operating cost, extensively existing in the prior art, the present invention provides a new method for treating dyeing wastewater by adopting the UV/acetylacetone process. As its ultraviolet irradiation step can quickly decolorize the wastewater, this method can be widely used in treating wastewater generated from textile industry as well as water polluted by dyeing materials.

2. Technical Solutions

The principle of this invention lies on the basic mechanisms of photochemical-based advanced oxidation processes. The ultraviolet absorption capacity of acetylacetone is two order of magnitude higher than that of $H_2O_2$ (the molar extinction coefficient of acetylacetone at 275 nm is 1800 $M^{-1}cm^{-1}$, while that of $H_2O_2$ at 254 nm is only 20 $M^{-1}cm^{-1}$). Therefore, it is adopted in combination with UV to form an UV/acetylacetone process for treating dyeing wastewater.

Specifically, the technical solutions include:

A method for treatment of dyeing wastewater by using UV/acetylacetone process, comprising following steps:

A) adding acetylacetone into dye-containing water, stirring and mixing them completely;

B) putting the liquid obtained in step A) under ultraviolet irradiation till it is effectively decolorized.

The dye-containing water should be filtrated before step A) so that the suspended solids contained therein can be removed. The concentration of dye in the dye-containing water mentioned in step A) is lower than 0.5 mM, while the pH value of the dye-containing water is lower than 9.0. The molar ratio between the dye and acetylacetone in step A) is 1:2-1:5, keeping the reaction temperature at 5-40° C. and putting it under 0.5-4 hours of ultraviolet irradiation with power intensity of 0.1-10 mW/$cm^2$, the decolorization rate of the dye-containing solution will reach 99% or even higher.

The ultraviolet adopted in step B) can be generated by either mercury lamps or black light lamps. Keeping the reaction temperature of step B) at 5-40° C. The irradiation time of step B) closely correlates with the concentration of dye, the amount of acetylacetone, and the power intensity of ultraviolet.

3. Beneficial Effects

The present invention discloses a method for treatment of dyeing wastewater by using UV/acetylacetone process. This method not only realizes quick decolorization of dye-containing wastewater, but also is self-accelerated as the reaction proceeds. In addition, this method can also increase the biodegradability of the treated water. Therefore, it can be adopted not only for decolorization of dye-containing water, but also as a preliminary step for microorganism (biological) treatment;

The present invention can be widely adopted in treatment of dyeing wastewater or water polluted by dyeing materials. Due to the adoption of ultraviolet irradiation, this method can realize quick decolorization of dye even though the molar concentration of coexisting organics is higher than that of dye. The biodegradability of the treated water is significantly improved ($BOD_5/COD$ from lower than 0.1 to higher than 0.3). Therefore, this method can be used not only to decolorize the dyes contained in the water but also as a preliminary step for microorganism (biological) treatment;

Acetylacetone, the major reagent used in this method, is more stable than $H_2O_2$ that has been widely used in photochemical oxidation processes. It is safer in transportation and storage;

This invention shares all the merits in the $UV/H_2O_2$ process, such as simple in operation and maintenance, while overcomes all weaknesses of the latter. The method disclosed in this invention presents high tolerance for coexisting organic substances or inorganic salts; it is also characterized with low reagent consumption, high decolorization efficiency and low operating cost. Therefore, this method can be widely used in treatment of dyeing wastewater or water polluted by dyeing materials.

BRIEF DESCRIPTION

DETAILED DESCRIPTION

Specific Examples

Figure 1:
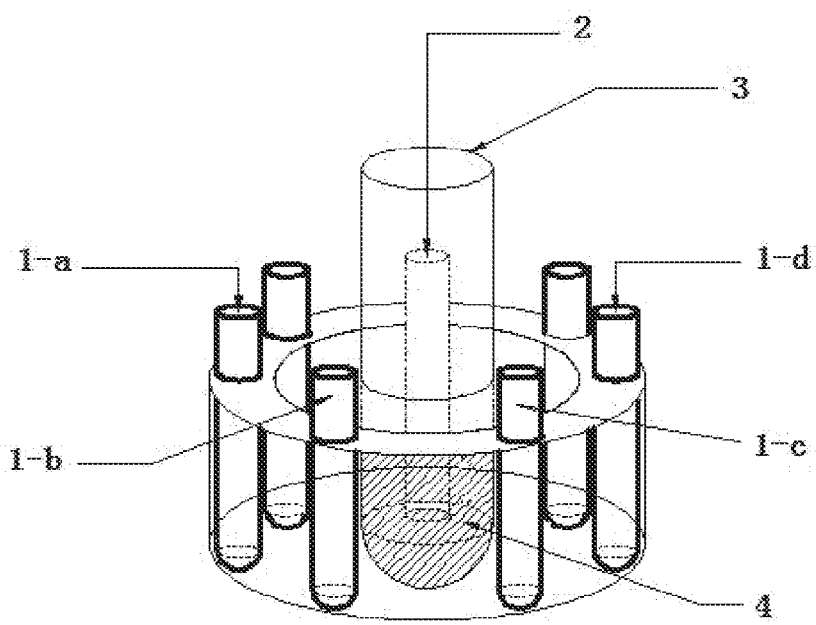
FIG. 1 is the diagram of the rotary photochemical reactor used in the practical examples of this invention.

The present invention is further described with reference to the following practical examples.

Example 1

Putting 25 ml aqueous solution containing 0.2 mM orange II and 0.5 mM acetylacetone into a quartz test tube (inside diameter 2 cm) and marking the test tube as 1-*a*; putting 25 ml aqueous solution containing 0.2 mM orange II and 0.5 mM $H_2O_2$ into another quartz test tube (inside diameter 2 cm) and marking the test tube as 1-*b*; placing the quartz test tubes (1) around a 300 W medium-pressure mercury lamp (2) with a sample to light distance of 6 cm in between; the axes of test tubes are in parallel with that of the mercury lamp (2); putting the mercury lamp (2) within a cooling jacket (3). Turning on the mercury lamp (2) for 5 minutes of preheating; when the power intensity at 365 nm reaches 4 $mW/cm^2$, removing the light shield (4) between the mercury lamp (2) and the quartz test tubes (1); the test tubes (1) revolve both around the mercury lamp (2) and on their own axes simultaneously; keeping the temperature at 25° C. After 1 hour of irradiation, the solution in the quartz test tube 1-*a* is completely decolorized while the decolorization rate of the solution in the quartz test tube 1-*b* is only 32%. This example indicates that the UV/acetylacetone process presents higher decolorization rate than the $UV/H_2O_2$ process.

The irradiation device adopted in this example is shown in FIG. 1.

Example 2

Keeping the irradiation device and formulation of solutions the same as those in example 1, and changing the temperature within the range 5-40° C., the decolorization rate of the solution in the quartz test tube 1-*a* constantly remains at 99% or even higher.

Example 3

Keeping the irradiation device and reaction conditions the same as those in example 1, adding into both the quartz test tube 1-*a* and the quartz test tube 1-*b* 0.2 mM ethanol. The decolorization rate of the solution in the test tube 1-*a* (UV/acetylacetone system) keeps virtually unchanged. In contrast, the decolorization rate of the solution in the test tube 1-*b* ($UV/H_2O_2$ system) decreases 33%. This example demonstrates that the UV/acetylacetone process presents better tolerance for coexisting organic pollutants than the $UV/H_2O_2$ process.

Example 4

Keeping the irradiation device and formulation of solutions the same as those in example 1, placing the quartz test tubes 1-*a* and 1-*b* within the irradiation field, and taking samples every 5 minutes for kinetic analysis. Under the above mentioned reaction conditions, the pseudo first-order constant of the decolorization rate of orange II in the UV/acetylacetone system is 5 times as high as that in the $UV/H_2O_2$ system in the first 45 minutes. After 45 minutes of irradiation, the decolorization rate in the UV/acetylacetone system is 5 times higher than that in the first 45 minutes. In contrast, the decolorization rate of the dye in the $UV/H_2O_2$ system shows no change through the whole process.

Example 5

Keeping the irradiation device and reaction conditions the same as those in example 1, putting into a quartz test tube 25 ml aqueous solution containing 0.2 mM orange II and 1 mM acetylacetone and marking the test tube as 1-*c*; putting into another quartz test tube 25 ml aqueous solution containing 0.2 mM orange II and 0.05 g/L P25 $TiO_2$ and marking the test tube as 1-*d*. After 2 hours of irradiation, the decolorization rate of the solution in the test tube 1-*c* is 100% while that in the test tube 1-*d* is only 45%.

Example 6

Figure 2:
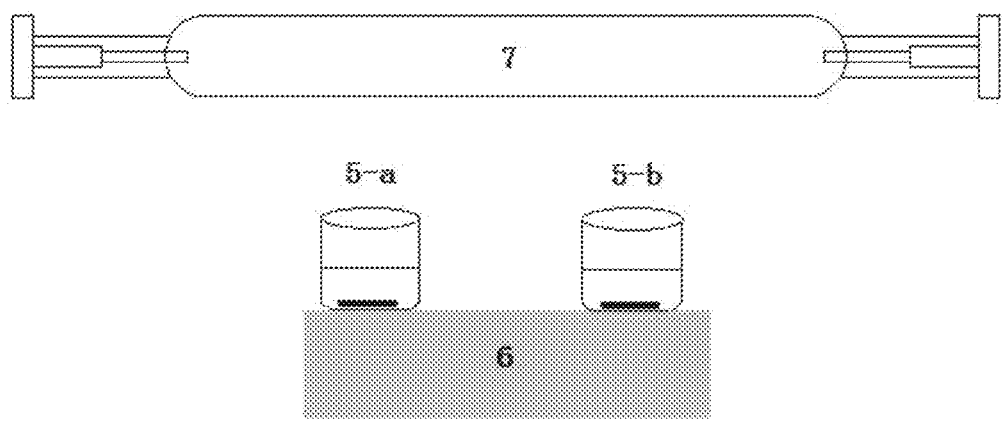
FIG. 2 is the diagram of another ultraviolet irradiation device used in the practical examples of this invention.

Putting 90 ml aqueous solution containing 0.15 mM orange II and 0.09 g/L acetylacetone into a glass beaker (inside diameter 5 cm) and marking the glass beaker as 5-*a*; putting 90 ml aqueous solution containing 0.15 mM orange II and 0.50 g/L P25 $TiO_2$ into another glass beaker (inside diameter 5 cm) and marking the glass beaker as 5-*b*; placing both beakers 5-*a* and 5-*b* on a magnetic stirrer (6) for stirring; hanging a 30 W low-pressure mercury lamp (7) 15 cm vertically high over the beakers; setting the irradiation intensity as 0.3 $mW/cm^2$ at 254 nm and turning on the low-pressure mercury lamp (7); keeping the reaction temperature at 25° C. After 100 minutes of irradiation, the decolorization rate of the solution in the beaker 5-*a* is 98% while that in the beaker 5-*b* is 95%. The irradiation device adopted in this example is shown in FIG. 2.

Example 7

Pouring 90 ml aqueous solution containing 0.5 mM orange II and acetylacetone into a glass culture dish and keeping the liquid layer in the culture dish 2 cm in depth; hanging a 1000 W high-pressure mercury lamp 5 cm vertically high over the culture dish; setting the irradiation intensity as 10 mW/cm$^2$ at 365 nm and turning on the high-pressure mercury lamp; keeping the reaction temperature at 25° C. After 3 hours of irradiation, the decolorization rate of the solution reaches 98%.

Example 8

Keeping the irradiation device and reaction conditions the same as those in sample 1, but changing the solutes to 0.12 mM Congo red and 0.3 mM acetylacetone. After 2 hours of irradiation, the decolorization rate of the solution so formulated reaches 75% while the decolorization rate of the solution treated with the UV/H$_2$O$_2$ process is merely 40%.

Example 9

Keeping the irradiation device and reaction conditions the same as those in sample 1, but changing the solutes to 0.12 mM methyl orange and 0.5 mM acetylacetone. After 4 hours of irradiation, the decolorization rate of the solution so formulated reaches 93% while the decolorization rate of the solution treated with the ultraviolet-H$_2$O$_2$ process is merely 46%.

Example 10

Keeping the irradiation device and reaction conditions the same as those in sample 1, but changing the solutes to 0.03 mM methylene blue and 0.3 mM acetylacetone. After 2 hours of irradiation, the decolorization rate of the solution so formulated reaches 97% while the decolorization rate of the solution treated with the ultraviolet-H$_2$O$_2$ process is 94%.

Example 11

Keeping the irradiation device and reaction conditions the same as those in sample 1, but changing the solutes to 0.03 mM Rhodamine B and 0.3 mM acetylacetone, After 2 hours of irradiation, the decolorization rate of the solution so formulated reaches 92% while the decolorization rate of the solution treated with the ultraviolet-H$_2$O$_2$ process is 92%.

Example 12

Keeping the irradiation device and reaction conditions the same as those in sample 1, but changing the solution to anthraquinone dye wastewater (5 times diluted) containing 1 mM acetylacetone; the COD and pH value of the said wastewater are 5000 mg/L and 8.3 respectively. After 2 hours of irradiation, the decolorization rate of the dye wastewater reaches 77%, while the decolorization rate of the same dye wastewater treated with the UV/H$_2$O$_2$ process is merely 19%.

Figure 3:
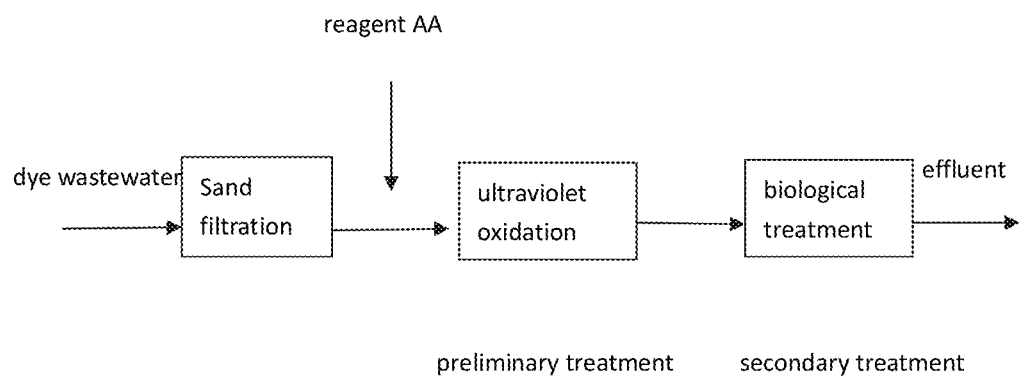
FIG. 3 is the flow chart of the method integrating ultraviolet oxidation and biological process in treatment of high-concentrated dye wastewater

FIG. 3 shows the flow chart of the process integrating the technique disclosed in the present invention and the traditional biological technique in treatment of dyeing wastewater, wherein AA refers to acetylacetone.

What is claimed is:

1. A method for treatment of dye wastewater by using ultraviolet-acetylacetone oxidation process, comprising following steps:
    A) adding acetylacetone into dye-containing water, stirring and mixing them completely; and
    B) putting a liquid obtained in step A) under ultraviolet irradiation until it is effectively decolorized;
    wherein the ultraviolet-acetylacetone process is performed without the presence of ozone.

2. The method for treatment of dye wastewater by using ultraviolet-acetylacetone oxidation process as defined in claim 1, wherein a concentration of the dye in the polluted water mentioned in step A) is lower than 0.5 mM, while the pH value of the water is lower than 9.0.

3. The method for treatment of dye wastewater by using ultraviolet-acetylacetone oxidation process as defined in claim 2, wherein a molar concentration of acetylacetone in the dye wastewater mentioned in step A) is 0.3-1.0 mM.

4. The method for treatment of dye wastewater by using ultraviolet-acetylacetone oxidation process as defined in claim 2, wherein the solution mentioned in step B) is subject to 0.5-4 hours of ultraviolet irradiation under a power intensity of 0.1-10 mW/cm$^2$, and the operation temperature is kept at 5-40° C.

5. The method for treatment of dye wastewater by using ultraviolet-acetylacetone oxidation process as defined in claim 2, wherein the ultraviolet mentioned in step B) is generated by any common mercury lamps or black light lamps.

6. The method for treatment of dye wastewater by using ultraviolet-acetylacetone oxidation process as defined in claim 2, wherein before step A) the suspending solids in the dye wastewater are removed by filtration.

* * * * *